United States Patent
Fu et al.

(10) Patent No.: US 8,961,807 B2
(45) Date of Patent: Feb. 24, 2015

(54) CMP COMPOSITIONS WITH LOW SOLIDS CONTENT AND METHODS RELATED THERETO

(71) Applicant: Cabot Microelectronics Corporation, Aurora, IL (US)

(72) Inventors: Lin Fu, Naperville, IL (US); Steven Grumbine, Aurora, IL (US)

(73) Assignee: Cabot Microelectronics Corporation, Aurora, IL (US)

( * ) Notice: Subject to any disclaimer, the term of this patent is extended or adjusted under 35 U.S.C. 154(b) by 21 days.

(21) Appl. No.: 13/841,344

(22) Filed: Mar. 15, 2013

(65) Prior Publication Data

US 2014/0263184 A1 Sep. 18, 2014

(51) Int. Cl.
- *C03C 15/00* (2006.01)
- *C09G 1/02* (2006.01)
- *B44C 1/22* (2006.01)

(52) U.S. Cl.
CPC .. *C09G 1/02* (2013.01); *B44C 1/221* (2013.01)
USPC .......... 216/89; 216/53; 216/88; 216/90; 216/91; 252/79.1; 252/79.4; 257/E21.23; 438/689; 438/690; 438/691; 438/692; 438/693

(58) Field of Classification Search
CPC ............. C09G 1/00; C09G 1/02; C09G 1/04; C09G 1/06; C09K 13/06; C09K 3/1463; C09K 3/1436; C09K 3/1409; H01L 21/3212; H01L 21/31051; H01L 21/31058; H01L 2224/11616
See application file for complete search history.

(56) References Cited

U.S. PATENT DOCUMENTS

| | | |
|---|---|---|
| 5,196,353 A | 3/1993 | Sandhu et al. |
| 5,433,651 A | 7/1995 | Lustig et al. |
| 5,609,511 A | 3/1997 | Moriyama et al. |
| 5,643,046 A | 7/1997 | Katakabe et al. |
| 5,658,183 A | 8/1997 | Sandhu et al. |
| 5,730,642 A | 3/1998 | Sandhu et al. |
| 5,838,447 A | 11/1998 | Hiyama et al. |
| 5,872,633 A | 2/1999 | Holzapfel et al. |
| 5,893,796 A | 4/1999 | Birang et al. |
| 5,949,927 A | 9/1999 | Tang |
| 5,964,643 A | 10/1999 | Birang et al. |
| 6,679,928 B2 | 1/2004 | Costas et al. |
| 6,821,897 B2 | 11/2004 | Schroeder et al. |
| 6,830,503 B1 | 12/2004 | Grumbine |
| 7,306,637 B2 | 12/2007 | Cherian et al. |

(Continued)

OTHER PUBLICATIONS

Anionic Surfactant Product Search on www.dow.com/products/, printed on May 7, 2014.*

(Continued)

*Primary Examiner* — Lan Vinh
*Assistant Examiner* — Jiong-Ping Lu
(74) *Attorney, Agent, or Firm* — Thomas E Omholt; Salim Hasan; Arlene Hornilla

(57) ABSTRACT

Disclosed are a polishing composition and method of polishing a substrate. The composition has low-load (e.g., up to about 0.1 wt. %) of abrasive particles. The polishing composition also contains water and at least one anionic surfactant. In some embodiments, the abrasive particles are alpha alumina particles (e.g., coated with organic polymer). The polishing composition can be used, e.g., to polish a substrate of weak strength such as an organic polymer. An agent for oxidizing at least one of silicon and organic polymer is included in the composition in some embodiments.

21 Claims, 4 Drawing Sheets

(56) References Cited

U.S. PATENT DOCUMENTS

| | | |
|---|---|---|
| 7,427,361 B2 | 9/2008 | Small et al. |
| 7,524,347 B2 | 4/2009 | Sun et al. |
| 7,615,497 B2 | 11/2009 | Bok et al. |
| 7,988,878 B2 | 8/2011 | Bian |
| 2008/0134585 A1* | 6/2008 | Brusic et al. .................. 51/308 |
| 2008/0203059 A1 | 8/2008 | De Rege Thesauro et al. |
| 2009/0035590 A1 | 2/2009 | Sullivan et al. |
| 2010/0155654 A1 | 6/2010 | Etoh et al. |
| 2010/0170868 A1 | 7/2010 | Lin et al. |
| 2012/0270395 A1 | 10/2012 | Ku |
| 2013/0011630 A1 | 1/2013 | Sullivan et al. |

OTHER PUBLICATIONS

Product Safety Assessment on Dowfax™ Anionic Surfactants, created by Dow Chemical Company on May 1, 2010.*

* cited by examiner

CMP COMPOSITIONS WITH LOW SOLIDS CONTENT AND METHODS RELATED THERETO

BACKGROUND OF THE INVENTION

Compositions and methods for planarizing or polishing the surface of a substrate are well known in the art. Chemical-mechanical planarization, or chemical-mechanical polishing (CMP), is a common technique used to planarize substrates. CMP utilizes a chemical composition, known as a CMP composition or more simply as a polishing composition (also referred to as a polishing slurry), for removal of material from the substrate. Polishing compositions typically are applied to a substrate by contacting the surface of the substrate with a polishing pad (e.g., polishing cloth or polishing disk) saturated with the polishing composition. The polishing of the substrate typically is aided by the chemical activity of the polishing composition and/or the mechanical activity of an abrasive suspended in the polishing composition or incorporated into the polishing pad (e.g., fixed abrasive polishing pad).

Conventional CMP compositions and methods typically are not entirely satisfactory at planarizing substrates. In particular, CMP polishing compositions and methods can result in less than desirable polishing rates and high surface defectivity when applied to a substrate. Because the performance of many substrates is directly associated with the planarity of their surfaces, it is crucial to use a CMP composition and method that results in a high polishing efficiency, selectivity, uniformity, and removal rate for a particular substrate and leaves the substrate with a high quality polish with minimal surface defects.

The difficulty in creating an effective polishing composition for semiconductor wafers stems from the complexity of the semiconductor wafer. Semiconductor wafers are typically composed of a substrate, on which a plurality of transistors has been formed. Integrated circuits are chemically and physically connected into a substrate by patterning regions in the substrate and layers on the substrate. To produce an operable semiconductor wafer and to maximize the yield, performance, and reliability of the wafer, it is desirable to polish select surfaces of the wafer without adversely affecting underlying structures or topography. In fact, various problems in semiconductor fabrication can occur if the process steps are not performed on wafer surfaces that are adequately planarized.

CMP compositions often contain oxidizing agents, which can react with the surface of the substrate and render the surface more susceptible to removal by mechanical abrasion. Oxidizing agents containing hydrogen peroxide have been used for this purpose, but may not provide a satisfactory removal rate for certain substrates, including those which are not highly reactive to peroxide.

Organic polymer materials are increasingly of interest for use in substrates. Some organic films exhibit a low dielectric constant (k), such as between 1 and about 2.2, and thereby have desired insulation property. Other organic films have higher dielectric constants. Organic polymer materials also are relatively inexpensive. Despite these advantages associated with the use of organic polymer films in substrates, there are tradeoffs with using organic polymers. In particular, organic polymers present significant challenges with respect to planarization because they can be mechanically soft and easy to scratch. Moreover, in contrast to their mechanical sensitivity, organic polymers are often chemically inert. The combination of these chemical and mechanical characteristics makes organic polymer dielectric materials difficult to polish using a traditional aqueous based CMP composition. Organic polymer materials used in semiconductor fabrication typically include (a) polymers with a relatively high organic content, (b) polymers with a low and high organic content with a high level of porosity, (c) polymers with relatively low organic content based upon silicon-oxygen type materials and inorganic materials, and (d) polymers with a combination of these properties.

A need remains for a polishing composition and polishing methods that will exhibit desirable removal rates and uniformity during the polishing and planarization of substrates containing organic polymer materials, while minimizing defectivity, such as surface imperfections and damage to underlying structures and topography during polishing and planarization. The invention provides such a polishing composition and method. These and other advantages of the invention, as well as additional inventive features, will be apparent from the description of the invention provided herein.

BRIEF SUMMARY OF THE INVENTION

In one aspect, the invention provides a polishing composition comprising (a) 0.01 wt. % to 0.001 wt. % of abrasive particles, (b) at least one anionic surfactant, and (c) water. The abrasive particles are desirably coated with a polymer, and the composition has a pH of about 1.5 to about 5.

In another aspect, the invention provides a polishing composition comprising (a) abrasive particles in an amount of up to 0.1 wt. %, (b) at least one anionic surfactant, (c) an oxidizing agent that oxidizes an organic polymer, and (d) water, wherein the composition has a pH of about 1.5 to about 5.

In another aspect, the invention provides a method of polishing a substrate. The method comprises contacting a substrate with a polishing pad and a polishing composition comprising (a) 0.001 wt. % to 0.1 wt. % of abrasive particles, (b) at least one anionic surfactant, and (c) water. The abrasive particles are desirably coated with a polymer, and the composition has a pH of about 1.5 to about 5. The method further comprises moving the polishing pad and the polishing composition relative to the substrate to abrade at least a portion of the substrate to polish the substrate.

In another aspect, the present invention provides a method of polishing a substrate comprising contacting a substrate with a polishing pad and a polishing composition comprising (a) abrasive particles in an amount of up to 0.1 wt. %, (b) at least one anionic surfactant, (c) an oxidizing agent that oxidizes an organic polymer, and (d) water, wherein the composition has a pH of about 1.5 to about 5. The method further comprises moving the polishing pad and the polishing composition relative to the substrate to abrade at least a portion of the substrate to polish the substrate.

BRIEF DESCRIPTION OF THE SEVERAL VIEWS OF THE DRAWING(S)

DETAILED DESCRIPTION OF THE INVENTION

Figure 1:
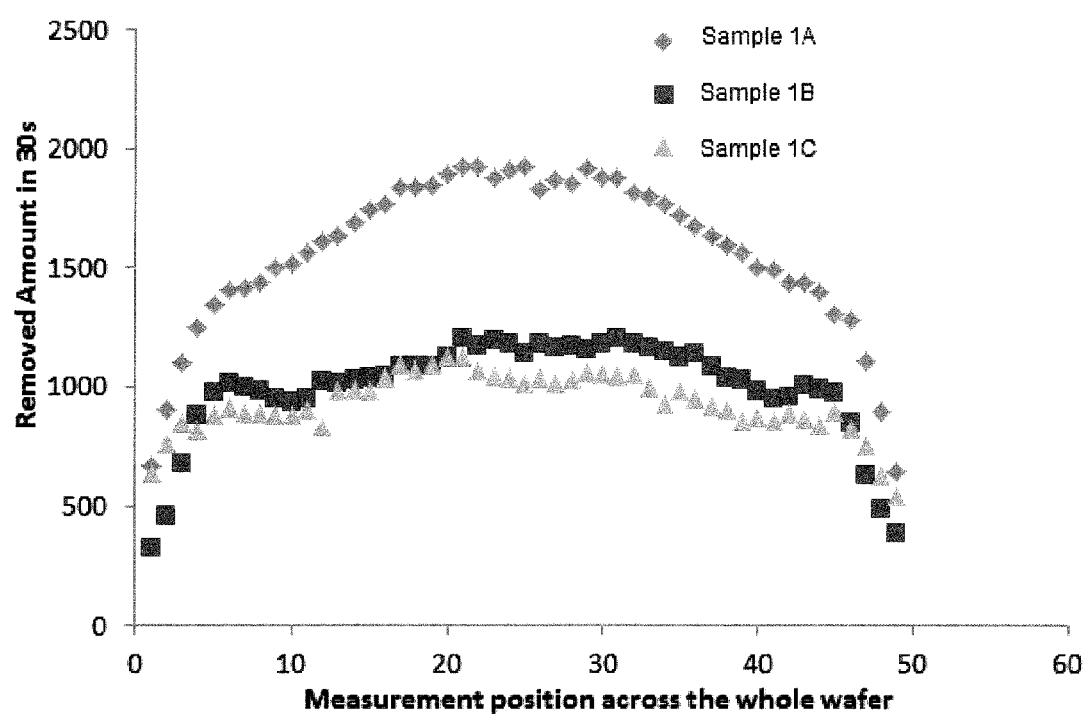
FIG. 1 is a graph plotting the removal amount in 30 seconds (Y-axis) vs. the measurement points from edge to edge of a wafer (X-axis) when polishing a substrate with three different polishing compositions, in accordance with embodiments of the invention.

Embodiments of the invention provide a polishing composition with low abrasive particle solids content. The polishing composition in accordance with embodiments of the invention comprises abrasive particles generally in an amount of about 0.1 wt. % or less (e.g., about 0.001 wt. % to about 0.1 wt. %), one or more anionic surfactants, and water. Such a polishing composition is in the form of slurry and can be used to polish surfaces, such as mechanically weak surfaces with a suitable chemical-mechanical polishing (CMP) apparatus including a polishing pad, such as described herein. In some embodiments, the polishing composition achieves high removal rates for organic film, while selectively achieving low removal rates for polysilicon material underlying the organic film material on a substrate. Furthermore, some embodiments of the polishing composition allow for good uniformity in removal across a substrate surface.

Advantageously, the polishing composition in accordance with embodiments of the invention surprisingly and unexpectedly results in desired removal rates previously known for polishing compositions having much higher abrasive particle concentrations. Furthermore, the polishing composition achieves such desired removal rates while also surprisingly and unexpectedly achieving low defectivity (e.g., scratches and the like) on the substrate being polished.

In some embodiments, the abrasive particles are selected to comprise metal oxides, particularly alumina, (e.g., alpha alumina), zirconia, colloidal silica, fumed silica, ceria, or combinations thereof. The aforementioned abrasive particles are desirably coated with polymer which is selected to provide a cushion when the abrasive particles in the polishing composition interact with a substrate being polished (e.g., polymeric film). For example, the abrasive particles can be coated with polymer effective to achieve a coefficient of friction (CoF) of about 0.1 to about 0.5 (e.g., about 0.2 to about 0.3), as determined according to a torque measurement method, as defined herein, when the abrasive particles contact the substrate to be polished (such as mechanically weak organic film) as applied with a CMP apparatus. In the torque measurement method defined herein, an ARG2 rheometer (using cone plate geometry) from TA Instruments (New Castle, Del.) is used to determine torque in N·m. A polishing pad ring is attached to the plate and slurries are added in between. The torque is measured when the cone is rotated at a fixed rpm of 100 relative to the bottom plate. The torque is then converted to CoF according to the following calculation:

$$CoF = \frac{\tau(R_2 + R_1)(10^{-4})}{N(R_2^2 + R_1^2)}$$

wherein $\tau$=Torque, $R_2$ is the outside diameter, $R_1$ is the inside diameter, and N is the normal force.

The polymer coating in some embodiments is a water soluble anionic polymer such as a hydrophilic, sulfonic acid acrylic polymer (including copolymers), acrylic acid polymer (including copolymers), maleic acid polymer (including copolymers, aspartic acid copolymer (including copolymer) or combinations thereof. For example, the coating can be in the form of a copolymer of acrylic acid poly(2-acrylamido-2-methyl-1-propane sulfonic acid), polyacrylic acid or any combination thereof. The polymer can be present in any suitable amount by weight of the abrasive particle, such as, for example, from about 5 wt. % to about 50 wt. %, e.g., from about 10 wt. % to about 30 wt. % (wt. % of polymers per weight basis of particles). In one illustrative embodiment, the abrasive particles are alpha alumina particles, which are coated with a copolymer of acrylic acid poly(2-acrylamido-2-methyl-1-propane sulfonic acid).

In some embodiments, the polishing composition is substantially free of colloidal silica particles, zirconia, and/or fumed silica particles as they are without any polymeric coating and because mechanically weak organic films at times can be susceptible to defectivity when such particles are used in the polishing composition. As used herein, "substantially free" of such other particles means that the polishing composition contains 0 wt. % based on the weight of the composition, or no such other particles, or an ineffective or immaterial amount of such particles. An example of an ineffective amount is an amount below the threshold amount to achieve the intended purpose of using such particles, as one of ordinary skill in the art will appreciate. An immaterial amount may be, e.g., below about 0.01 wt. %, as one of ordinary skill in the art will appreciate.

The abrasive particles can be present in the polishing composition in any suitable concentration of about 0.1 wt. % or less. For example, in various embodiments, the abrasive particles can be included in the polishing composition in an amount from about 0.001 wt. % to about 0.1 wt. %, such as, for example, from about 0.0025 wt. % to about 0.1 wt. %, about 0.01 wt. % to about 0.1 wt. %, from about 0.03 wt. % to about 0.1 wt. %, from about 0.05 wt. % to about 0.1 wt. %, from about 0.01 wt. % to about 0.08 wt. %, from about 0.02 wt. % to about 0.08 wt. %, from about 0.03 wt. % to about 0.08 wt. %, from about 0.01 wt. % to about 0.06 wt. %, from about 0.02 wt. % to about 0.06 wt. %, from about 0.01 wt. % to about 0.05 wt. %, or from about 0.02 wt. % to about 0.05 wt. %.

The abrasive particles, such as coated alpha alumina particles, can have any suitable particle size. The size of a particle is the diameter of the smallest sphere that encompasses the particle. The coated abrasive particles can have an average particle size of about 10 nm or more, e.g., about 25 nm or more, about 50 nm or more, about 75 nm or more, or about 100 nm or more. Alternatively, or in addition, the coated abrasive particles can have an average particle size of about 250 nm or less, e.g., about 225 nm or less, about 200 nm or less, about 175 nm or less, about 160 nm or less, or about 150 nm or less. Thus, the coated abrasive particles can have a particle size bounded by any of the foregoing endpoints. For example, coated abrasive particles can have an average particle size of about 25 nm to about 250 nm, e.g., about 35 nm to about 200 nm, about 45 nm to about 150 nm, about 50 nm to about 125 nm, about 55 nm to about 120 nm, or about 60 nm to about 115 nm.

The abrasive particles desirably are suspended in the polishing composition, more specifically in the aqueous carrier of the polishing composition. When the abrasive particles are suspended in the polishing composition, the abrasive particles preferably are colloidally stable. The term colloid refers to the suspension of abrasive particles in the aqueous carrier. Colloidal stability refers to the maintenance of that suspension over time. In the context of this invention, abrasive particles are considered colloidally stable if, when the abrasive particles are placed into a 100 ml graduated cylinder and allowed to stand unagitated for a time of 2 hours, the difference between the concentration of particles in the bottom 50 ml of the graduated cylinder ([B] in terms of g/ml) and the concentration of particles in the top 50 ml of the graduated cylinder ([T] in terms of g/ml) divided by the initial concentration of particles in the abrasive composition ([C] in terms of g/ml) is less than or equal to 0.5 (i.e., {[B]−[T]}/[C]≤0.5). The value of [B]−[T]/[C] desirably is less than or equal to 0.3, and preferably is less than or equal to 0.1.

One or more anionic surfactants are included in embodiments of the inventive polishing composition. The anionic surfactant is included as a promoter for enhancing the removal rate of the substrate surface being polished. Anionic surfactants are preferred over nonionic surfactants (e.g., difunctional block copolymers and the like) and cationic surfactants inasmuch as anionic surfactants are believed to wet and lubricate the substrate surface being polished to enhance the hydrophilicity of the substrate surface (e.g., organic film). Desirably, the polishing pad used in the CMP apparatus is also hydrophilic to further facilitate the removal rate of the substrate surface being polished.

Particularly, in accordance with some embodiments of the invention, the anionic surfactant is effective to decrease the contact angle of the substrate surface to about 60° or less (e.g., down from an angle of about 70° or greater) when a water droplet is applied to the substrate surface. In some embodiments, the anionic surfactant is effective to reduce the contact angle of the substrate surface to about 50° or less, e.g., about 40° or less, 30° or less, 20° or less, or 15° or less. The contact angle can be measured by any suitable technique, such as drop shape method understood in the art. In some embodiments, the anionic surfactant comprises carboxylates, sulfonates, sulfates, phosphates, phosphonates, and combinations thereof. For example, the anionic surfactant can comprise a sulfonate group, such as diphenyl oxide disulfonate.

The anionic surfactant can be present in the polishing composition in any suitable concentration. For example, in various embodiments, the anionic surfactant can be included in the polishing composition in an amount from about 0.0002 wt. % to about 2 wt. %, such as, for example, from about 0.002 wt. % to about 0.2 wt. %, from about 0.01 wt. % to about 0.02 wt. %.

Optionally, in some embodiments, the polishing composition can include one or more oxidizing agents. The oxidizing agent is selected to oxidize the substrate to be polished, including, e.g., organic films. For example, in some embodiments, the oxidizing agent includes at least one peroxy (—O—O—) group. Such peroxy-type oxidizers can be an organic peroxide, inorganic peroxide, or combination thereof. Examples of compounds containing at least one peroxy group include, but are not limited to, hydrogen peroxide and its adducts such as urea hydrogen peroxide and percarbonates (e.g., sodium percarbonate), organic peroxides such as benzoyl peroxide, peracetic acid, perboric acid, and di-tert-butyl peroxide, monopersulfates ($SO_5^{2-}$), dipersulfates ($S_2O_8^{2-}$), and sodium peroxide. In one embodiment, the oxidizer is hydrogen peroxide.

If included, the one or more oxidizers can be present in the polishing composition in any suitable concentration. For example, in various embodiments, the oxidizer can be included in the polishing composition in an amount from about 0.1 wt. % to about 10 wt. %, such as, for example, from about 0.1 wt. % to about 5 wt. %, from about 1 wt. % to about 3 wt. %, or from about 1 wt. % to about 2 wt. %.

The polishing composition includes an aqueous carrier. The aqueous carrier contains water (e.g., deionized water), and may contain one or more water-miscible organic solvents. Examples of organic solvents that can be used include alcohols such as propenyl alcohol, isopropyl alcohol, ethanol, 1-propanol, methanol, 1-hexanol, and the like; aldehydes such as acetylaldehyde and the like; ketones such as acetone, diacetone alcohol, methyl ethyl ketone, and the like; esters such as ethyl formate, propyl formate, ethyl acetate, methyl acetate, methyl lactate, butyl lactate, ethyl lactate, and the like; ethers including sulfoxides such as dimethyl sulfoxide (DMSO), tetrahydrofuran, dioxane, diglyme, and the like; amides such as N, N-dimethylformamide, dimethylimidazolidinone, N-methylpyrrolidone, and the like; polyhydric alcohols and derivatives of the same such as ethylene glycol, glycerol, diethylene glycol, diethylene glycol monomethyl ether, and the like; and nitrogen-containing organic compounds such as acetonitrile, amylamine, isopropylamine, imidazole, dimethylamine, and the like. Preferably, the aqueous carrier is (i.e., consists of) water.

The polishing composition can have any suitable pH. Typically, the polishing composition has a pH of about 1 or greater. The pH of the polishing composition typically is about 5 or less. For example, the polishing composition can have a pH in the range of about 1 to about 5 (e.g., a pH of 1.5, a pH of 2, a pH of 2.5, a pH of 3, a pH of 3.5, a pH of 4, a pH of 5, or a pH in a range defined by any two of these pH values). Preferably, the pH is in the range of about 1 to about 3.5, or about 2 to about 3.5, such as about 2 to about 2.5.

The pH of the polishing composition can be achieved and/or maintained by any suitable means. More specifically, the polishing composition can further comprise a pH adjustor, a pH buffering agent, or a combination thereof. The pH adjustor can be any suitable pH-adjusting compound. For example, the pH adjustor can be an acid. The acid can be any suitable acid. Typically, the acid is acetic acid, nitric acid, phosphoric acid, oxalic acid, and combinations thereof. Preferably, the acid is nitric acid. The pH adjustor alternatively can be a base. The base can be any suitable base. Typically, the base is potassium hydroxide, ammonium hydroxide, and combinations thereof. Preferably, the base is ammonium hydroxide. The pH buffering agent can be any suitable buffering agent. For example, the pH buffering agent can be a phosphate, sulfate, acetate, borate, ammonium salt, and the like. The polishing composition can comprise any suitable amount of a pH adjustor and/or a pH buffering agent, provided that a suitable amount is used to achieve and/or maintain the pH of the polishing composition within the pH ranges set forth herein.

In some embodiments, the polishing composition is substantially free of metal complexing agents, corrosion inhibitors, and/or rheology or viscosity agents. Examples of such materials are set forth in co-pending, commonly-assigned U.S. patent application Ser. No. 13/754,413, entitled Chemical-Mechanical Polishing Composition Containing Zirconia and Metal Oxidizer. As used herein, "substantially free" of such metal complexing agents, corrosion inhibitors, and/or rheology or viscosity agents means that the polishing composition contains 0 wt. % based on the weight of the composition, or no such metal complexing agents, corrosion inhibitors, and/or rheology or viscosity agents, or an ineffective or immaterial amount of such metal complexing agents, corrosion inhibitors, and/or rheology or viscosity agents. An example of an ineffective amount is an amount below the threshold amount to achieve the intended purpose of using such metal complexing agents, corrosion inhibitors, and/or rheology or viscosity agents, as one of ordinary skill in the art will appreciate. An immaterial amount may be, e.g., below about 0.05 wt. %, such as below about 0.01 wt. %, as one of ordinary skill in the art will appreciate. However, if desired in alternative embodiments, such ingredients can be included in the polishing composition.

The polishing composition can be prepared by any suitable technique, many of which are known to those skilled in the art. The polishing composition can be prepared in a batch or continuous process. Generally, the polishing composition can be prepared by combining the components herein in any order.

Embodiments of the invention also provide a method of polishing a substrate with the polishing composition described herein. The method of polishing a substrate comprises (i) providing a substrate, (ii) providing a polishing pad, (iii) providing the aforementioned chemical-mechanical polishing composition, (iv) contacting the substrate with the polishing pad and the chemical-mechanical polishing composition, and (v) moving the polishing pad and the chemical-mechanical polishing composition relative to the substrate to abrade at least a portion of the substrate to polish the substrate. In another aspect, the present invention provides a method of polishing a substrate.

In particular, some embodiments of the method comprises contacting a substrate with a polishing pad and a polishing composition comprising (a) 0.001 wt. % to 0.1 wt. % of abrasive particles, (b) at least one anionic surfactant, and (c) water. The abrasive particles are desirably coated with a polymer, and the polishing composition has a pH of about 1.5 to about 5. The method further comprises moving the polishing pad and the polishing composition relative to the substrate to abrade at least a portion of the substrate to polish the substrate.

In addition, some embodiments of the invention provide a method of polishing a substrate comprising contacting a substrate with a polishing pad and a polishing composition comprising (a) abrasive particles in an amount of up to 0.1 wt. %, (b) at least one anionic surfactant, (c) an oxidizing agent that oxidizes an organic polymer, and (d) water, wherein the composition has a pH of about 1.5 to about 5. The method further comprises moving the polishing pad and the polishing composition relative to the substrate to abrade at least a portion of the substrate to polish the substrate.

The inventive polishing composition can be useful for polishing any suitable substrate. The substrate to be polished can be the other surface of any multi-layer workpiece. Suitable substrates include the layers of semiconductors, MEMS (microelectromechanical systems), and optical waveplates, as well as anti-reflective coatings (ARC). The polishing composition is particularly useful in the polishing of a substrate that is mechanically weak, particularly a substrate comprising an organic polymer film. In this respect, while the polishing composition can be used for polishing organic polymer films with any suitable carbon content, in some embodiments, the polishing composition is well suited for polishing substrates containing a high level of carbon, e.g., at least about 50%, such as at least about 60%, at least 70%, at least 80% or higher, e.g., from about 50% to about 85%, such as from about 60% to about 85%, or about 70% to about 85%, as measured by carbon analysis.

For example, in some embodiments, the mechanically weak organic film substrate exhibits an elastic modulus (Young's modulus) of about 2.5 GPa or less, as determined according to ASTM E 111, e.g., about 2 GPa or less, such as about 1.5 GPa or less, 1 GPa or less, 0.5 GPa or less, etc. In some embodiments, the substrate is a hydrophobic organic film, e.g., exhibiting a contact angle of about 70° or more where a water droplet is applied to the film.

An organic polymer film to be polished with the inventive polishing composition can have any suitable dielectric constant, such as a dielectric constant of about 3.5 or less (e.g., about 3 or less, about 2.5 or less, about 2 or less, about 1.5 or less, or about 1 or less). Alternatively, or in addition, the organic polymer film can have a dielectric constant of about 1 or more (e.g., about 1.5 or more, about 2 or more, about 2.5 or more, about 3 or more, or about 3.5 or more). Thus, the organic polymer film can have a dielectric constant bounded by any two of the foregoing endpoints. For example, the organic polymer film can have a dielectric constant between about 1 and about 3.5 (e.g., between about 2 and about 3, between about 2 and about 3.5, between about 2.5 and about 3, between about 2.5 and about 3.5).

Suitable organic polymer films can comprise spin-on-carbon materials, many of which are known the art. Such spin-on-carbon materials generally have high carbon content as described herein and are generally formed by a spin-coating method. See, e.g., U.S. Pat. No. 7,615,497 and U.S. Patent Publications 2009/0035590; 2010/0170868; 2012/0270395; and 2013/0011630. One commercially available spin-on-carbon material is OptiStack® SOC110D from Brewer Science, Rolla, Mo.

Other suitable organic films include, for example, polyimide, fluorinated polyimide, polyarylenes and polyarylene ethers (such as SILK™ from Dow Chemical, FLARE™ from Allied Signal, and VELOX™ from Schumacher), polybenzocyclobutene, divinyl siloxane bisbenzocyclobutene (DVS-BCB), polytetrafluoroethylene (PTFE), polysiloxane, polynaphthylene ether, polyquinolines, paralynes (such as Parylene AF4, an aliphatic tetrafluorinated poly-p-xylylene), copolymers thereof, and combinations thereof. Desirably, the organic polymer film comprises a ring-containing organic polymer, such as a heterocyclic organic polymer (e.g., polybenzoxazole). The substrate optionally can be free of one or more silica or metal layers, especially metal layers comprising copper, tantalum, tungsten, titanium, platinum, ruthenium, iridium, aluminum, nickel, and/or combinations thereof. In some embodiments, during substrate fabrication, gap sealing techniques can be employed. In this respect, a layer of organic film can be oxidized at elevated temperature to form carbon dioxide and burn off the organic polymer to form an air gap as space filling material between oxidizing layers in a sandwich structure. This arrangement allows the substrate to use air's low dielectric constant of 1.

In accordance with the invention, a substrate can be planarized or polished with the polishing composition described herein by any suitable technique. The polishing methods of the invention are particularly suited for use in conjunction with a CMP apparatus. Typically, the CMP apparatus comprises a platen, which, when in use, is in motion and has a velocity that results from orbital, linear, or circular motion, a polishing pad in contact with the platen and moving with the platen when in motion, and a carrier that holds a substrate to be polished by contacting and moving relative to the surface of the polishing pad. Embodiments of polishing compositions of the invention allow for increased platen speeds (e.g., about 50 or greater, such as about 100 or greater.) The polishing of the substrate takes place by the substrate being placed in contact with the polishing composition of the invention and then abrading at least a portion of the surface of the substrate, e.g., the organic polymer film, or one or more of the substrate materials described herein, with the polishing composition to polish the substrate.

Desirably, the CMP apparatus further comprises an in situ polishing endpoint detection system, many of which are known in the art. Techniques for inspecting and monitoring the polishing process by analyzing light or other radiation reflected from a surface of the workpiece are known in the art. Such methods are described, for example, in U.S. Pat. No. 5,196,353, U.S. Pat. No. 5,433,651, U.S. Pat. No. 5,609,511, U.S. Pat. No. 5,643,046, U.S. Pat. No. 5,658,183, U.S. Pat. No. 5,730,642, U.S. Pat. No. 5,838,447, U.S. Pat. No. 5,872,633, U.S. Pat. No. 5,893,796, U.S. Pat. No. 5,949,927, and U.S. Pat. No. 5,964,643. Desirably, the inspection or monitoring of the progress of the polishing process with respect to a workpiece being polished enables the determination of the polishing end-point, i.e., the determination of when to terminate the polishing process with respect to a particular workpiece.

The following examples further illustrate the invention but, of course, should not be construed as in any way limiting its scope.

Example 1

This example compares the effect of three different polishing compositions (1A-1C) on the removal rate of spin-on-carbon (SoC) organic film substrates (wafers).

In particular, the SoC substrates were polished with polishing compositions 1A-1C with conventional CMP apparatus. The polishing compositions included coated alpha alumina particles in varying amounts. Particularly, the alpha alumina particles were treated with acrylic acid poly(2-acrylamido-2-methyl-1-propane sulfonic acid). Each polishing composition also included 1 wt. % of the oxidizing agent hydrogen peroxide ($H_2O_2$). All three polishing compositions were adjusted as necessary to a pH of 2.3.

Two of the polishing compositions also included a surfactant as a removal rate promoter, in accordance with embodiments of the invention. The surfactant was a diphenyl oxide disulfonate anionic surfactant, commercially available under the DOWFAX brand. For comparison purposes, the third polishing composition did not include a surfactant but included a significantly higher concentration of coated abrasive particles. The amounts of coated alpha alumina particles, surfactant, and hydrogen peroxide are set forth in Table 1 below:

TABLE 1

| Polishing Composition | Coated Abrasive Particles (wt. %) | Surfactant (wt. %) | $H_2O_2$ (wt. %) |
|---|---|---|---|
| 1A | 0.012 | 0.01 | 1 |
| 1B | 0.1 | 0 | 1 |
| 1C | 0.0025 | 0.01 | 1 |

The substrates were polished on a REFLEXION™ CMP apparatus (Applied Materials, Inc., Santa Clara, Calif.). The polishing pad used for polishing compositions 1A and 1B was a D200 42D XY grooved pad (Cabot Microelectronics, Aurora, Ill.), while the polishing pad used for polishing composition 1C was a POLYTEX™ pad (Rodel, Inc, Phoenix, Ariz.). The polishing parameters were as follows: 6.89 kPa (1 psi) down force, 50 rpm platen speed, and 47 rpm head speed.

Following polishing, the removal rate of SoC was determined in Å. The results are illustrated in FIG. 1, which is a plot of removal rate amount in 30 seconds (Y-axis) at measurement points (X-axis), which indicates the location of measurements spanning the entire distance of the wafer.

These results demonstrate that the coated alpha alumina particles in combination with a surfactant are particularly effective for polishing substrates comprising organic film, even at low concentration of the abrasive particles. In particular, polishing composition 1A had a considerably higher rate of removal than polishing composition 1B, even though polishing composition 1A had almost an order of magnitude less of the abrasive particles. Furthermore, polishing composition 1C had comparable removal rates as polishing composition 1B, even though polishing composition 1B had 40 times the amount of abrasive particles as polishing composition 1C. In addition, the polishing compositions exhibited good uniformity, with a non-uniformity rate less than 15% for polishing composition 1A, less than 13% for polishing composition 1B, and less than 10% for polishing composition 1C.

Example 2

This example compares the effect of three different polishing compositions (2A-2C) on the number of defects when polishing SoC organic film substrates.

In particular, the SoC substrates were polished with polishing compositions 2A-2C with a conventional CMP apparatus. Each polishing composition included coated alpha alumina particles in varying amounts and hydrogen peroxide oxidizing agent as described in Example 1. All three polishing compositions similarly were adjusted as necessary to a pH of 2.3.

Polishing compositions 2B and 2C included surfactant as a removal rate promoter, in accordance with embodiments of the invention. Both polishing compositions 2B and 2C included the diphenyl oxide disulfonate anionic surfactant described in Example 1. Polishing composition 2C further included a nonionic surfactant, namely, a difunctional block copolymer terminating in primary hydroxyl groups, commercially available as Pluronic 31™ (BASF, Inc., Florham Park, N.J.). For comparison purposes, polishing composition 2A did not include surfactant. The amounts of coated alpha alumina particles, surfactant, and hydrogen peroxide are set forth in Table 2 below:

TABLE 2

| Polishing Composition | Coated Abrasive Particles (wt. %) | Anionic Surfactant (diphenyl oxide disulfonate) (wt. %) | Nonionic Surfactant (difunctional block copolymer) (wt. %) | $H_2O_2$ (wt. %) |
|---|---|---|---|---|
| 2A (comparative) | 0.082 | 0 | 0 | 1 |
| 2B | 0.05 | 0.1 | 0 | 1 |
| 2C | 0.082 | 0.1 | 0.1 | 1 |

The substrates were polished on a REFLEXION™ CMP apparatus (Applied Materials, Inc., Santa Clara, Calif.). The polishing pad was a D200 42D XY grooved pad (Cabot Microelectronics, Aurora, Ill.). The polishing parameters were as described in Example 1.

Figure 2:
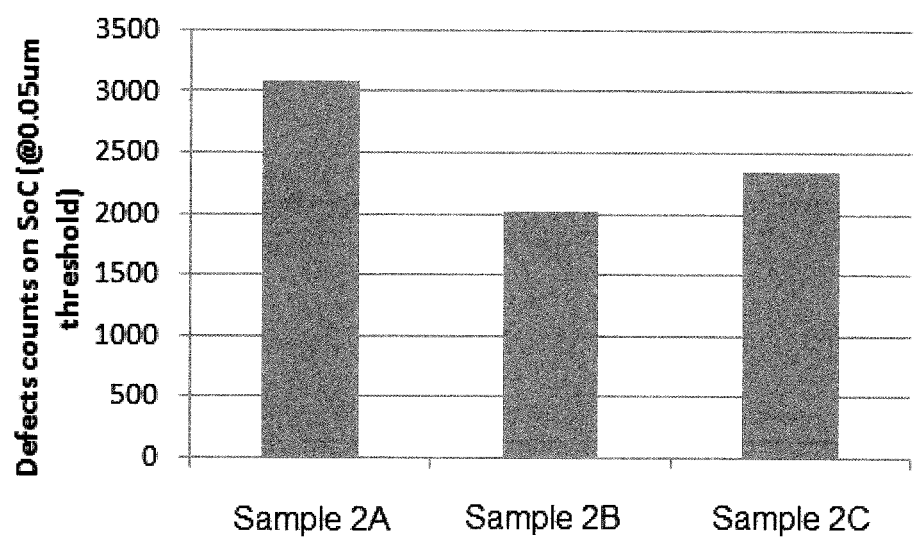
FIG. 2 is a bar graph illustrating the number of defects on a substrate resulting from the use of three separate polishing compositions containing various amounts of abrasive particles.

Following polishing, the number of substrate defects was determined, with a threshold size of 0.05 microns to qualify as a defect. The results are illustrated in FIG. 2, which is a bar graph that indicates the number of substrate defects caused by each polishing composition.

These results demonstrate that the coated alpha alumina particles in combination with surfactant is particularly effective for polishing substrates comprising an organic film with low defect count, particularly at lower abrasive concentration. In particular, polishing composition 2B provided had the lowest substrate defect count while having the lowest abrasive concentration and also including surfactant. Furthermore, polishing composition 2A provided a considerably higher substrate defect count than polishing composition 2C at the same abrasive concentration, but polishing composition 2C included surfactant while polishing composition 2A did not include surfactant.

Example 3

Comparative

This example illustrates the propensity of SoC organic film substrates to exhibit defectivity when subjected to polishing in conventional systems.

A polishing composition including 0.5 wt. % of colloidal silica and 1% hydrogen peroxide, and having a pH of 2.3, was used to polish a SoC organic film substrate with conventional CMP apparatus. The substrates were polished on a REFLEXION™ CMP apparatus (Applied Materials, Inc., Santa Clara, Calif.). The pad was a D200 42D XY grooved pad (Cabot Microelectronics, Aurora, Ill.). The polishing parameters were as described in Example 1.

Figure 3:
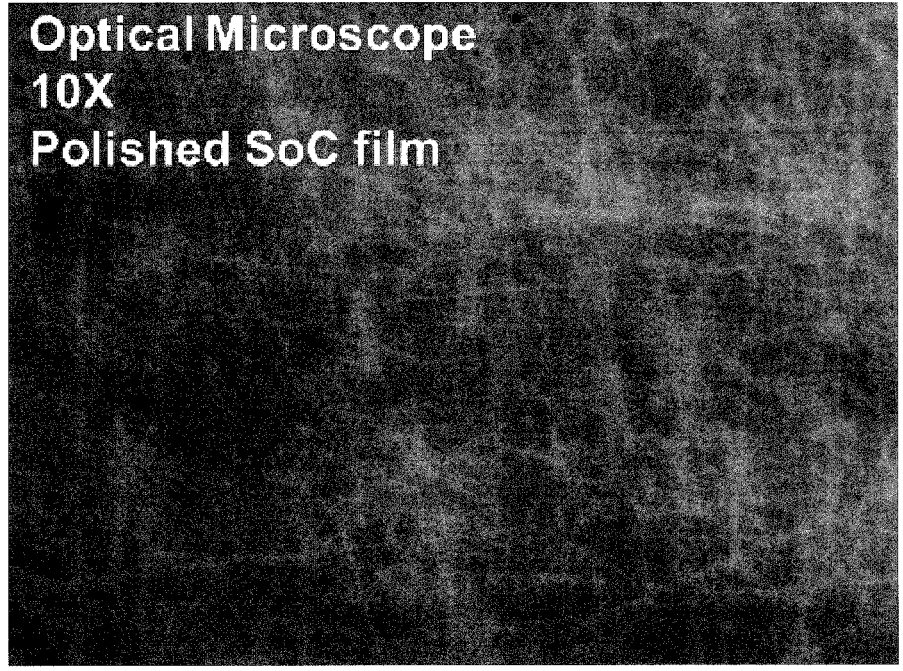
FIG. 3 is an optical microscopy image at 10× magnification of a spin-on-carbon substrate, which was polished using a polishing composition that includes a conventional load of abrasive particles, for comparative purposes.

After polishing, an optical microscopy image of the polished spin-on-carbon substrate was taken at 10× magnification, as depicted in FIG. 3. As is apparent from FIG. 3, the polished substrate exhibited considerable scratching when subjected to the conventional polishing composition which contained conventional abrasive particles in a conventional concentration range.

Example 4

This example compares the effect of including various surfactants in different polishing compositions relative to the removal rate of (a) spin-on-carbon (SoC) organic films and (b) polysilicon underlying the organic films.

Five polishing compositions were tested (4A-4E). All of the polishing compositions included 0.15 wt. % of abrasive particles and 1% hydrogen peroxide as described in Example 1, and all the polishing compositions were adjusted as necessary to achieve a pH of 2.3.

Each polishing composition varied with respect to the surfactant. More particularly, polishing composition 4A included no surfactant. Polishing compositions 4B included 0.03 wt. % of nonionic surfactant commercially available as Surfynol 104PG™, from Air Products, Allentown, Pa. Polishing composition 4C included 0.01 wt. % of nonionic surfactant characterized as difunctional block copolymer terminating in primary hydroxyl groups, commercially available as Pluronic 31™ (BASF, Inc., Florham Park, N.J.) Polishing composition 4D included 0.01 wt. % of diphenyl oxide disulfonate anionic surfactant, commercially available as DOWFAX™, from Dow (Midland, Mich.). Polishing composition 4E included 2 wt. % of dimethyl sulfoxide (DMSO).

The substrates were polished on a Mirra™ CMP apparatus (Applied Materials, Inc., Santa Clara, Calif.). The polishing pad was a D200 42D XY grooved pad (Cabot Microelectronics, Aurora, Ill.). The polishing parameters were as described in Example 1.

Figure 4:
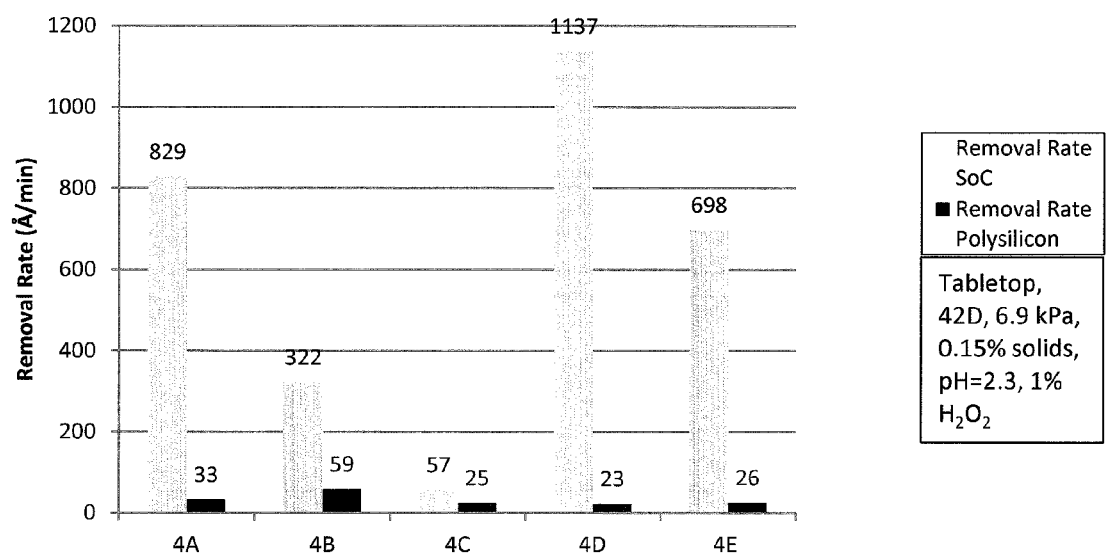
FIG. 4 is a bar graph illustrating the removal rate of polysilicon and spin-on-carbon from a substrate using polishing compositions comprising various surfactants or no surfactant.

Following polishing, the removal rate of SoC was determined in Å/min. The results are illustrated in FIG. 4, which is a bar graph illustrating the removal rate affected by each polishing composition on the SoC film and on the underlying polysilicon. As is apparent from FIG. 4, the removal rate of the SoC was highest, and the removal rate of the polysilicon was the lowest, with the diphenyl oxide disulfonate anionic surfactant.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A polishing composition comprising:
   (a) 0.001 wt. % to 0.1 wt. % of abrasive particles coated with a polymer,
   (b) an anionic surfactant comprising diphenyl oxide disulfonate, and
   (c) water,
   wherein the composition has a pH of about 1.5 to about 5.

2. The polishing composition of claim 1, wherein the abrasive particles comprise alumina, fumed silica, silica, and/or zirconia.

3. The polishing composition of claim 1, wherein the abrasive particles comprise alpha alumina.

4. The polishing composition of claim 1, wherein the polymer is effective to achieve a coefficient of friction of about 0.1 to about 0.5, as determined according to the torque measurement method, when the particles contact an organic film substrate having an elastic modulus of about 2.5 GPa or less as determined according to ASTM E 111.

5. The polishing composition of claim 1, wherein the polymer is a water soluble anionic polymer.

6. The polishing composition of claim 1, wherein the polymer is an acrylic acid poly(2-acrylamido-2-methyl-1-propane sulfonic acid).

7. The polishing composition of claim 1, wherein the composition is effective for polishing an organic film, the composition further comprising an oxidizing agent that oxidizes an organic polymer.

8. The polishing composition of claim 1, wherein the composition is effective for polishing an organic film having a contact angle of about 70° or greater when a water droplet is applied to the organic film, and wherein the anionic surfactant is effective to reduce the contact angle of the organic film to about 60° or less when a water droplet is applied to the organic film.

9. A polishing composition comprising:
  (a) abrasive particles in an amount of up to 0.1 wt. %,
  (b) an anionic surfactant comprising diphenyl oxide disulfonate,
  (c) an oxidizing agent that oxidizes an organic polymer with carbon content of at least about 60%, and
  (d) water,
  wherein the composition has a pH of about 1.5 to about 5.

10. The polishing composition of claim 9, wherein the abrasive particles comprise alpha alumina particles coated with a polymer.

11. The polishing composition of claim 10, wherein the polymer is an acrylic acid poly(2-acrylamido-2-methyl-1-propane sulfonic acid).

12. A method of polishing a substrate, which method comprises:
  (i) contacting a substrate with a polishing pad and the polishing composition of claim 1; and
  (ii) moving the polishing pad and the polishing composition relative to the substrate to abrade at least a portion of the substrate to polish the substrate.

13. The method of claim 12, wherein the substrate comprises an organic polymer and the organic polymer is abraded to polish the substrate.

14. The method of claim 13, wherein the organic polymer comprises a spin-on-carbon material.

15. The method of claim 13, wherein the organic polymer has an elastic modulus of about 2.5 GPa or less, as measured according to ASTM E 111.

16. The method of claim 13, wherein the contacting results in a coefficient of friction of about 0.1 to about 0.5, as determined according to the torque measurement method when the particles contact the organic film substrate.

17. A method of polishing a substrate, which method comprises:
  (i) contacting a substrate with a polishing pad and the polishing composition of claim 9; and
  (ii) moving the polishing pad and the polishing composition relative to the substrate to abrade at least a portion of the substrate to polish the substrate.

18. The method of claim 17, wherein the substrate comprises an organic polymer and the organic polymer is abraded to polish the substrate.

19. The method of claim 18, wherein the organic polymer comprises a spin-on-carbon material.

20. The method of claim 18, wherein the organic polymer has an elastic modulus of about 2.5 GPa or less, as measured according to ASTM E 111.

21. The method of claim 18, wherein the contacting results in a coefficient of friction of about 0.1 to about 0.5, as determined according to the torque measurement method when the particles contact the organic film substrate.

* * * * *